United States Patent
Park

(10) Patent No.: US 8,831,818 B2
(45) Date of Patent: Sep. 9, 2014

(54) DIAGNOSIS SYSTEM AND METHOD OF OXYGEN SENSOR FOR HYBRID VEHICLE

(71) Applicants: Hyundai Motor Company, Seoul (KR); Kia Motors Corporation, Seoul (KR)

(72) Inventor: Taekwook Park, Incheon (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 108 days.

(21) Appl. No.: 13/683,303

(22) Filed: Nov. 21, 2012

(65) Prior Publication Data

US 2014/0058597 A1 Feb. 27, 2014

(30) Foreign Application Priority Data

Aug. 24, 2012 (KR) .................. 10-2012-0092949

(51) Int. Cl.
G01M 17/00 (2006.01)
F01N 11/00 (2006.01)
G06F 17/00 (2006.01)

(52) U.S. Cl.
CPC .............. *G06F 17/00* (2013.01); *F01N 11/007* (2013.01); *Y10S 903/93* (2013.01)
USPC .............................. 701/29.7; 701/22; 903/930

(58) Field of Classification Search
CPC .............. F02D 41/1495; F02D 41/123; F02D 41/1454; F01N 11/00; F01N 11/007; F01N 2550/00
USPC ................. 701/22, 29.1, 29.7, 103, 108, 109; 123/325
See application file for complete search history.

(56) References Cited

U.S. PATENT DOCUMENTS

2009/0118988 A1   5/2009   Moening et al.

FOREIGN PATENT DOCUMENTS

| JP | 2008-279823 A | 11/2008 |
| JP | 2009-046076 A | 3/2009 |
| JP | 2010-019186 A | 1/2010 |
| JP | 2010-179712 A | 8/2010 |
| KR | 10-2006-0002157 | 1/2006 |
| KR | 10-2011-0062135 A | 6/2011 |

*Primary Examiner* — Thomas Tarcza
*Assistant Examiner* — Kevin Myhre
(74) *Attorney, Agent, or Firm* — Edwards Wildman Palmer LLP; Peter F. Corless

(57) ABSTRACT

A diagnosis method of an oxygen sensor for hybrid vehicles is disclosed, which includes receiving a diagnosis request signal for the diagnosis of an oxygen sensor from an EMS (Engine Management System) which is configured to control the engine; determining when a passive-run condition is occurring, under which the speed of a vehicle is within a previously set deceleration range as an accelerator is turned off in response to receiving the diagnosis request signal, and disengaging the engine clutch when the passive-run condition is occurring. Next fuel is cut to the engine in response to receiving a diagnosis request signal while the engine operating at a previously set reference speed by controlling the HSG once the engine clutch is disengaged. Once the above steps are complete a diagnosis of the oxygen sensor is then performed.

16 Claims, 2 Drawing Sheets

DIAGNOSIS SYSTEM AND METHOD OF OXYGEN SENSOR FOR HYBRID VEHICLE

CROSS-REFERENCE(S) TO RELATED APPLICATIONS

This application claims priority to Korean Patent Application No(s). 10-2012-0092949, filed on Aug. 24, 2012, which is incorporated herein by reference in its entirety.

BACKGROUND OF THE INVENTION

1. Field of the Invention

The present invention relates to a diagnosis system and method of an oxygen sensor for hybrid vehicles, and particularly to a diagnosis method of an oxygen sensor for hybrid vehicles w in maximum the generation of a harmful exhaust gas in case of an abnormal operation in such a way to monitor if an oxygen sensor operates normally.

2. Description of Related Art

Vehicles are often equipped with an oxygen sensor for meeting emission standards in various states and countries. In recent years, vehicles have begun to be equipped with a diagnosis function which allows the vehicle to diagnose an oxygen sensor during its active state to satisfy OBD (On Board Diagnostic) regulations as well.

In hybrid vehicles in particular, the above mentioned diagnosis function is performed under the control of a HCU (Hybrid Control Unit) which is configured to control the substantially every function which is executed within the vehicle and an EMS (Engine Management System) which is configured to control the engine. The decision to turn on or off the engine and injection is totally under control of the HCU. Thus, the EMS, which is in communication with the HCU, is turns on and off the engine in the vehicle based on control signals from the HCU.

In hybrid vehicles in particular, the following conditions when starting an oxygen sensor diagnosis function. When a diagnosis start request is received from the EMS (Engine Management System), the HCU (Hybrid Control Unit) starts controlling the engine to operate without stopping within a certain speed range for a certain amount of time in a fuel-cut state, so a required condition for the start of the diagnosis function can be satisfied. For example, the diagnosis request signal might consist of a long fuel-cut signal (5 sec/instance, for a total one time) and a short fuel-cut signal (3 sec/instance, total three times) to satisfy the OBD (On Board Diagnostic) regulation.

The conventional hybrid vehicle is generally configured to have the engine driven in a state that an engine clutch is actively engaged using a passive run start of an engine to satisfy the required condition for the diagnosis functions of an oxygen sensor. When there is an oxygen sensor diagnosis request from the EMS, the HCU determines if the engine is currently in a passive-run state. If the above mentioned condition is satisfied, the engine clutch is engaged, the injection is turned off and the fuel is cut. When the condition for an oxygen sensor diagnosis is satisfied, EMS starts performing the oxygen sensor diagnosis.

The conventional diagnosis method for an oxygen sensor of a hybrid vehicle, however, has the following problems. First, uneasiness on the part of the driver might somehow felt while the engine brake is being operated during a tip-out since the engine clutch remains engaged. This consequently causes operation of the vehicle feel different to the driver because a minor error occurs in the amount of the model computation-based engine friction torque. Second, the braking might also feel uneasiness also owing to the release of the engine clutch during regenerative braking as a driver steps on the brake. Therefore, this uneasy feeling on the part of the driver often because an error occurs in the regenerative braking operation owing to a transfer torque error in the engine clutch. Third, a delay occurs in the oxygen sensor diagnosis function owing to a start/release condition which occurs while the engine is being passively run. So, the diagnosis is completed after the vehicle has been running for about 20~30 minutes.

SUMMARY OF THE INVENTION

Accordingly, it is an object of the present invention to provide a diagnosis method of an oxygen sensor for hybrid vehicles which makes it possible to increase regenerative energy, improve fuel efficiency, expand an oxygen sensor diagnosis start condition and improve vehicle driving comfort by eliminating the requirement that the engine clutch be engaged in order to satisfy the required conditions for an oxygen sensor diagnosis initiation, to the extent that the above mentioned condition can be satisfied even though an engine clutch is disengaged.

To achieve the above objects, there is provided a diagnosis method of an oxygen sensor for hybrid vehicles which has a HSG (Hybrid Starter Generator) for the driving of an engine. In particular, the HSG is configured to receive a diagnosis request signal for triggering diagnosis of an oxygen sensor from an EMS (Engine Management System) which is configured to control the engine. Once this signal is received, the HSG is configured to determine whether a passive-run condition is met/occurring and if so disengages the engine clutch. In particular, a passive-run condition is met when the speed of a vehicle is within a previously set deceleration range as an accelerator is turned off in response to receiving the diagnosis request signal. Additionally, fuel is cut to an engine in response to receiving the diagnosis request signal while the engine is being operated at a previously set reference speed by controlling the HSG while the engine clutch is disengaged. Once the above processes are completed, the EMS instructed to diagnosis the oxygen sensor while the engine is being driven at the previously set reference speed.

The diagnosis request signal is previously set so that the diagnosis of the oxygen sensor can be completed within a previously set time in accordance with an exhaust gas discharge regulation of associated with vehicle. The diagnosis request signal may be formed of a long fuel-cut signal which is configured to cut the fuel to the engine once for five seconds per instance, and a short fuel-cut signal which is configured to cut the fuel to the engine three times for three seconds each instance.

More specifically, it may only be determined that a passive-run condition is occurring when an engine and a motor are both operating at a first and a second previously set speed respectively. The deceleration range may be determined in response to the SOC values of a battery installed in the vehicle.

The passive-run condition may further require the vehicle be currently operating an EV (Electric Vehicle) mode. Furthermore, the reference speed may be determined based on a cooling water temperature of the vehicle, and when the fuel is cut to the engine is based on a speed change state of the vehicle.

Advantageously, since the exemplary embodiment utilizes engine speed control which does not require engagement of the clutch to diagnose the oxygen sensor regenerative energy and fuel efficiency can be improved, and since an oxygen sensor diagnosis is initiated without engagement of the clutch the vehicle also operates more smoothly.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
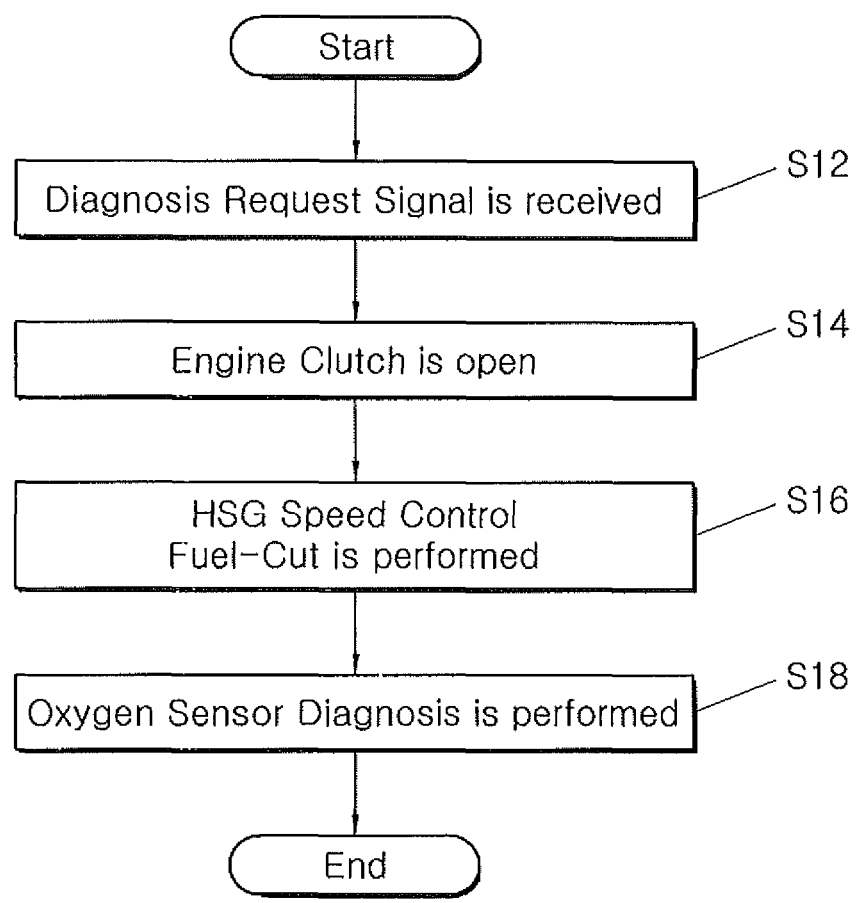
FIG. 1 is a control flow chart of a diagnosis method of an oxygen sensor for hybrid vehicles according to an exemplary embodiment of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DESCRIPTION OF SPECIFIC EMBODIMENTS

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Although exemplary embodiment is described as using a plurality of units to perform the exemplary process, it is understood that the exemplary processes may also be performed by one or plurality of modules. Additionally, it is understood that the term controller refers to a hardware device that includes a memory and a processor. The memory is configured to store the modules and the processor is specifically configured to execute said modules to perform one or more processes which are described further below.

Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The diagnosis method of an oxygen sensor for hybrid vehicles according to an embodiment of the present invention will be described with reference to the accompanying drawings.

The hybrid vehicle to which a diagnosis method of an oxygen sensor for hybrid vehicles according to the exemplary embodiment of the present invention includes a transmission (T/M) configured to adjust the speed ratio between a driving shaft and a wheel shaft, a driving motor configured to transfer a driving force to the driving shaft with the aid of an electrical energy from a battery, an engine, an engine clutch configured to transfer a driving force of the engine to a motor shaft, and HSG (Hybrid Starter Generator) configured to control the state of the engine, e.g., when the engine is turned on and off.

FIG. 1 is a control flow chart of a diagnosis method of an oxygen sensor for hybrid vehicles according to the exemplary embodiment of the present invention. The above mentioned control procedures may be under the control of an HCU 200 (Hybrid Control Unit) (shown in FIG. 2) which is configured to collect a driver's demand request (i.e., acceleration, braking, etc.) and state information associated with the vehicle and to control the entire vehicle operation including an engine and a driving motor therefrom.

Referring to FIG. 1, HCU 200 receives a diagnosis request signal for initiating the diagnosis of an oxygen sensor from an EMS (Engine Management System) which controls the engine to perform the diagnosis method of an oxygen sensor for hybrid vehicles according to the embodiment of the present invention (S12). The diagnosis request signal is previously set taking into consideration OBD standards (On Board Diagnostic) and exhaust gas discharge regulations associated with the vehicle so that the diagnosis of the oxygen sensor can be completed within a set period of time. For example, the diagnosis request signal may be formed of a long fuel cut signal which is configured to cut the fuel to the engine once for five seconds per instance, and a short fuel-cut signal which is configured to cut the fuel to the engine three times for three seconds each time.

The HCU is configured to judge when the passive-run condition, in which an accelerator is disconnected, and the speed of a vehicle resides within a previously set deceleration range, is occurring in response to receiving the diagnosis request signal and to allow the engine clutch to be disengage when the passive-run condition is occurring (S14).

In order to determine when the passive-run condition is occurring S14, the HCU should monitoring the speed of the vehicle and the speed of the motor. Only when the speed of the engine and the motor are at a previously set reference value is the passive-run condition occurring.

The deceleration range of the passive-run condition can be determined in accordance with state of charge (SOC) values of the battery installed in the vehicle. The passive-run condition might further include a condition under which the vehicle must be driven in the EV (Electric Vehicle) mode.

Next, once the engine clutch is disengaged in S14, the engine is driven at a previously set reference speed by controlling the HSG (Hybrid Control Unit) and at the same time the fuel is cut in response to receiving the diagnosis request signal (S16). The reference speed can be determined based on the cooling water temperature of the vehicle, and the fuel cut control of the engine can be performed in consideration of a speed change state of the vehicle in response to receiving the diagnosis request signal. Finally, once the fuel to the engine is cut as the engine starts driving at a reference speed in S16, a control signal for the purpose of controlling the diagnosis of the oxygen sensor is transmitted to the EMS (S18).

Figure 2:
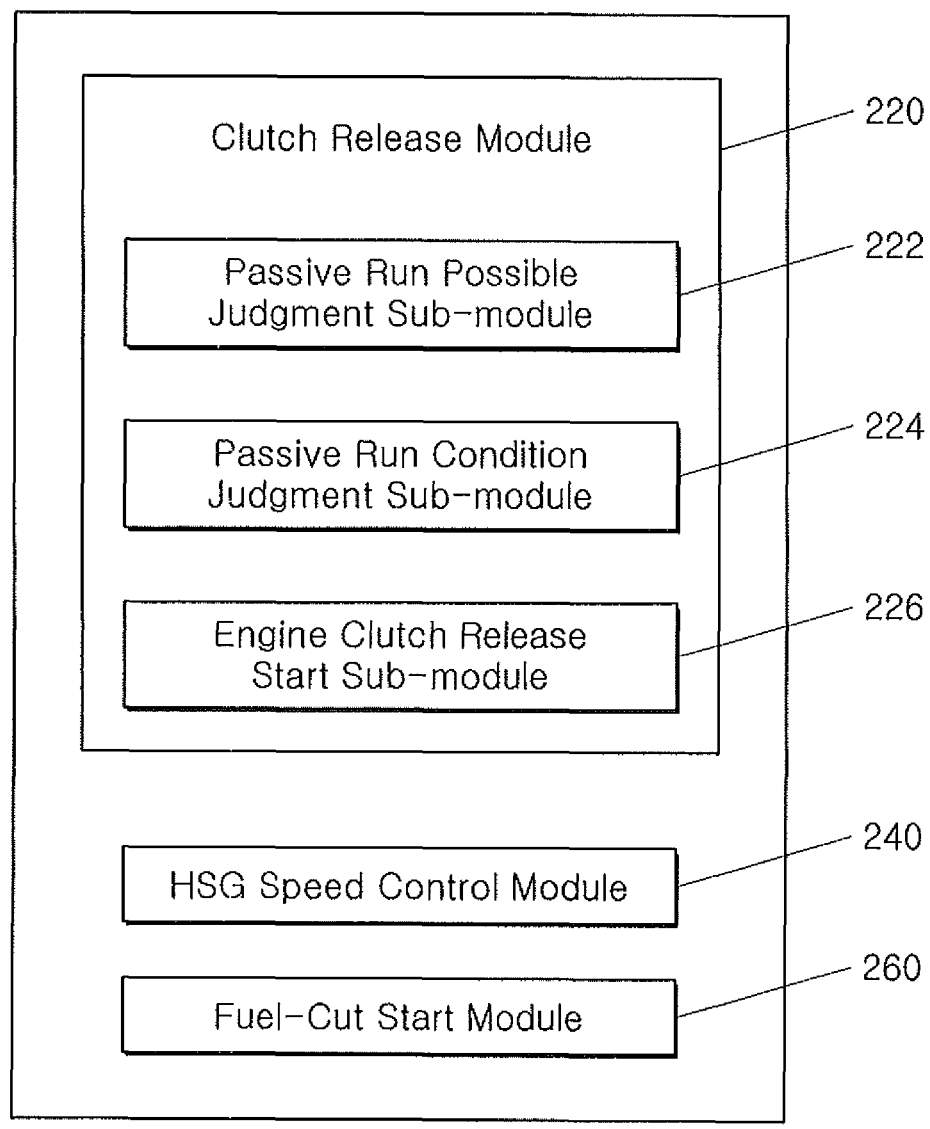
FIG. 2 is a block diagram illustrating HCU (Hybrid Control Unit) which performs a diagnosis method of an oxygen sensor for hybrid vehicles according to an embodiment of the present invention.

Referring to FIG. 2, the above described control procedures will be explained by a plurality of control function modules executed by a processor and stored on a memory of the HCU 200. FIG. 2 is a block diagram illustrating a HCU (Hybrid Control Unit) which performs a diagnosis method of an oxygen sensor for hybrid vehicles according to an embodiment of the present invention.

As shown in FIG. 2, the HCU 20 comprises a clutch release module 220, a HSG speed control module 240 and a fuel-cut start module 260, which are classified for the sake of the simplified descriptions. It is apparent that the diagnosis method of an oxygen sensor for hybrid vehicles according to the present invention is not limited thereto.

The clutch release module 220 comprises a passive-run possible judgment sub-module 222, a passive-run condition judgment sub-module 224 and an engine clutch release start sub-module 226. The passive-run possible judgment sub-module 222 is configured to determine whether the vehicle is in a passive run condition by monitoring the speed of the vehicle and the speed of the motor.

The passive-run judgment sub-module 224 is configured to determine whether the vehicle is currently within a set deceleration range while an accelerator is disconnected in response to receiving the diagnosis request signal once the passive run condition is determined to be occurring by the passive-run possible judgment sub-module 222.

The engine clutch release start sub-module 226 is configured to control the engine clutch and specifically to disengage the engine clutch once the passive-run condition is determined to be occurring.

The HSG speed control module 240 operates the engine at a previously set reference speed via executing engine speed control functions on the HSG (Hybrid Control Unit). Here, the reference speed can be determined based on the cooling water temperature of the vehicle.

The fuel-cut start module 260 is configured to cut the fuel to the engine by turning off the fuel injection in response to receiving the diagnosis request signal when the engine is driven at the previously set reference speed by means of the HSG speed control module 240. The fuel cut control of the engine can be performed in consideration of a speed change state of the vehicle in response to receiving the diagnosis request signal.

The diagnosis method of an oxygen sensor for hybrid vehicles according to the exemplary embodiment of the present invention is directed to transmitting a control signal to the EMS for the purpose of controlling the diagnosis of an oxygen sensor once fuel has been cut to the engine via the HSG. In other words, the diagnosis of the oxygen sensor can be performed under control of the HCU.

As described above, according to the present invention, when the fuel cut of the engine is performed by means of the HSG, a control signal for controlling and performing the diagnosis of the oxygen sensor is transmitted to the EMS. Namely, the EMS facilitates the diagnosis of the oxygen sensor in accordance with engine control via the HCU without the clutch being engaged.

Unlike the conventional art which maintaining engagement of an engine clutch, the illustrative embodiment of the present invention is able to execute diagnosis functions of the oxygen sensor based on a constant speed control of the HSG (Hybrid Starter Generator) without the clutch being engaged so that regenerative energy and fuel efficiency are improved thanks to the improvements in the unnecessary maintenance of the engine clutch engagement state, and since an oxygen sensor diagnosis start condition is altered, the vehicle is able to operate more smoothly.

In other words, the diagnosis method of an oxygen sensor for hybrid vehicles according to the present embodiment, the shock and jerk conditions which occur during the release of an unnecessary engine clutch engagement maintenance can be avoided, and the oxygen sensor can be diagnosed during the EV (Electric Vehicle) mode while the clutch is disengaged from the driving shaft, which result in the enhancement of a NVH (Noise, Vibration and Hardness) performance of the vehicle, and the braking performance can be enhanced. Accordingly, the quality hybrid vehicles can be enhanced as a result.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A diagnosis method of an oxygen sensor for hybrid vehicles which has a HSG (Hybrid Starter Generator) for the driving of an engine, comprising:
   receiving a diagnosis request signal to trigger diagnosis of an oxygen sensor from an EMS (Engine Management System) which is configured to control the engine;
   in response to receiving the diagnosis request signal, determining when a passive-run condition is occurring in the vehicle, and disengaging an engine clutch when the passive-run condition is occurring;
   cutting fuel to the engine in response to receiving the diagnosis request signal while the engine is running at a previously set reference speed by controlling the HSG when the engine clutch is disengaged; and
   diagnosing, by the EMS, the oxygen sensor once the fuel is cut to the engine while the engine is being driven at the previously set reference speed.

2. The method of claim 1, wherein the diagnosis request signal is previously set so that the diagnosis of the oxygen sensor is finished within a previously set time in accordance with an exhaust gas discharge regulation of the vehicle.

3. The method of claim 2, wherein the diagnosis request signal is embodied as a long fuel-cut signal which is configured to cut the fuel to the engine once for five seconds per instance the fuel is cut, and a short fuel-cut signal which is configured to cut the fuel to the engine three times for three seconds for each instance the fuel is cut.

4. The method of claim 1, wherein the passive-run condition occurs only when a speed of the vehicle and a speed of a motor are both operating at a first and a second previously set speed respectively.

5. The method of claim 1, wherein a deceleration speed range of the passive-run condition is determined in response to one or more state of charge (SOC) values of a battery installed in the vehicle.

6. The method of claim 1, wherein the passive-run condition further requires the vehicle is driving in the EV (Electric Vehicle) mode.

7. The method of claim 1, wherein the previously set reference speed is determined based on a cooling water temperature value of the vehicle.

8. The method of claim 1, wherein the fuel is cut to the engine based on a speed change state of the vehicle.

9. A non-transitory computer readable medium containing program instructions executed by a processor within a controller, the computer readable medium comprising:
   program instructions that receive a diagnosis request signal which triggers diagnosis of an oxygen sensor from an EMS (Engine Management System) which is configured to control the engine;
   program instructions that, in response to receiving the diagnosis request signal, determine when a passive-run condition is occurring in the vehicle, and disengage an engine clutch when the passive-run condition is determined to have occurred;
   program instructions that cut fuel to the engine in response to receiving the diagnosis request signal and a passive-run condition occurring while the engine is running at a previously set reference speed; and
   program instructions that diagnose the oxygen sensor once the fuel is cut to the engine while the engine is being driven at the previously set reference speed.

10. The non-transitory computer readable medium of claim 9, wherein the diagnosis request signal is previously set so that the diagnosis of the oxygen sensor is finished within a previously set time in accordance with an exhaust gas discharge regulation of the vehicle.

11. The non-transitory computer readable medium of claim 10, wherein the diagnosis request signal is embodied as a long fuel-cut signal which is configured to cut the fuel to the engine once for five seconds per instance, and a short fuel-cut signal which is configured to cut the fuel to the engine three times for three seconds each time.

12. The non-transitory computer readable medium of claim 9, wherein the program instructions that determine whether the passive-run condition is occurring is performed only when a speed of the vehicle and a speed of a motor are both operating at a first and a second previously set speed respectively.

13. The non-transitory computer readable medium of claim 9, wherein a deceleration speed range of the passive-run condition is determined in response to one or more state of charge (SOC) values of a battery installed in the vehicle.

14. The non-transitory computer readable medium of claim 9, wherein the passive-run condition further requires the vehicle is driving in the EV (Electric Vehicle) mode.

15. The non-transitory computer readable medium of claim 9, wherein the previously set reference speed is determined based on a cooling water temperature value of the vehicle.

16. The non-transitory computer readable medium of claim 9, wherein the fuel is cut to the engine based on a speed change state of the vehicle.

* * * * *